Patented Jan. 19, 1937

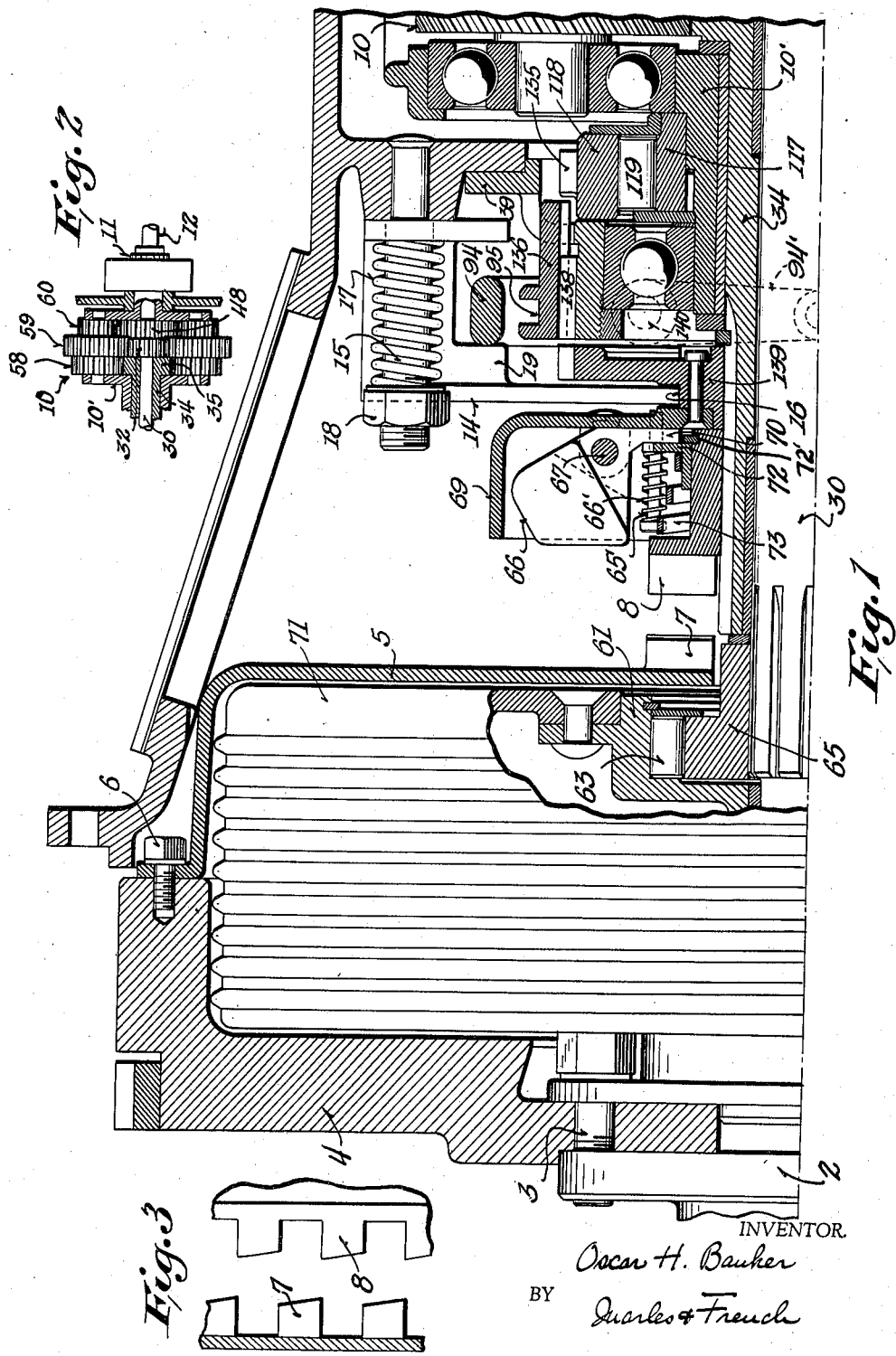

2,067,897

UNITED STATES PATENT OFFICE 2,067,897

AUTOMATIC TRANSMISSION

Oscar H. Banker, Chicago, Ill., assignor to New Products Corporation, Chicago, Ill., a corporation of Illinois Application June 14, 1935, Serial No. 26,608

3 Claims. (Cl. 74—260)

The invention relates to automatic transmissions.

The present application shows certain modifications of the structure of a companion application Serial No. 24,035 filed May 29, 1935, the main object of the present invention being the arrangement and construction of the second speed jaw clutch and its relation to the engine drive shaft. According to the present invention one of the jaws of the second speed clutch is formed on a member connected for direct drive of the engine drive shaft whereby the automatic engine clutch is eliminated when second speed is established. Furthermore, one of the members of this jaw clutch is manually movable to connect the driven shaft to the engine to facilitate starting the motor when the battery is low or disconnect the same when the vehicle is traveling at a high rate of speed and the jaws are entirely clear of each other when in neutral position so that when the engine is being raced in neutral position, the gears will not engage.

The invention further consists in the several features hereinafter set forth and more particularly defined by claims at the conclusion hereof.

In the drawing:

Fig. 1 is a half section view through a transmission embodying the invention, parts being broken away and parts being shown in section;

Fig. 2 is a diagrammatic view of the gearing and its connection with the driven shaft;

Fig. 3 is a detail elevation view of the clutch jaws.

In the drawing, the numeral 2 designates a part of the engine drive shaft connected by bolts 3 to the engine flywheel 4 which has a drum-like member 5 secured thereto by bolts 6, said member having jaw clutch teeth 7 for the second speed clutch.

The transmission gearing is in general similar to that of my prior U. S. Patent No. 1,996,790, dated April 9, 1935, but follows more in detail the structure shown and described in my copending application Serial No. 24,035. The drawing shows a pair of transmission drive shafts 30 and 34 similar to the shafts 30 and 34 of said Patent No. 1,996,790 and similarly connected through planetary gearing here designated generally by the numeral 10, and an automatic high speed jaw clutch similar to that of said copending application and shown diagrammatically at 11 in Fig. 2 to the driven shaft 12. The clutch drum 71 of the low speed automatic clutch connects the engine drive shaft 2 with the low speed shaft 30 through the overrunning roller clutch including the drum 61, rollers 63 and actuator 65 similar to similarly numbered parts in said patent. The centrifugally operable clutch elements for engaging the drum 71 may be like those of said patent or any other suitable construction.

The planetary gearing is held against retrograde movement by an automatic brake comprising an actuator 117, brake drum 118 and rollers 119 similar to corresponding parts in said patent, the drum adapted to be locked or released at the will of the operator through a shiftable toothed member 136 similar to a like numbered member shown in Fig. 4 of said patent slidably mounted on the splines or teeth 138 on a fixed member 39 and adapted to mesh in the position of forward drive with the teeth 135 on the drum 118 and in the reverse position with a clutch gear 139 which is also slidably splined to the second speed transmission shaft 34.

In the aforementioned patent the second speed automatic clutch is similar to that of the first speed clutch. In the present application the second speed clutch is an overrunning jaw type clutch similar to that shown in Fig. 5 of the aforementioned pending application except in the present case the clutch acts to connect the second speed shaft 34 direct with the engine flywheel 4 through the member 5. This clutch includes a jaw clutch element 8 whose hub is slidably splined on the transmission shaft 34 and operated through speed responsive mechanism including weighted levers 66, one of which is shown pivotally mounted on a pin 67 carried by a weight movement-limiting and supporting drum 69 which is riveted to the hub of the clutch gear 139 also slidably splined to the shaft 34. The ends 70 of the levers 66 engage a flanged collar 72 and a coil spring 73 forms a yieldable driving connection between this collar and the clutch member 8 itself, said member being normally urged to a withdrawn position by means of springs 65' interposed between said collar and bolts 66' secured to the drum 69, said collar then engaging a stop 72' on the hub of said clutch member 8. This arrangement permits the clutch member 8 to be moved by the weights 66 and it also permits the whole clutch assembly including the parts 8, 69, and 139 to be moved manually as a unit.

For manual operation of the clutch member 8 a shifter member 94 is pivotally supported on the housing at the points 140 and its forked ends 94' are adapted to engage in an annular groove 95 in the member 136 and to shift the same longitudinally while said member 94 is swung about its pivotal mounting. The upper end of the shifter member 94 is adapted in its neutral and its forward drive positions to engage a lug 19 on a shifter fork 14 which is slidably mounted on a rod 15 and has its fork portion working in an annular groove 16 formed between the member 139 and drum 69, said fork being normally held in the clutch release position by a spring 17 mounted on said rod 15 between said fork and a nut 18. The parts in Fig. 1 are shown in their neutral position. When the operator through suitable control connections with the shifter member 94 swings the upper end thereof toward the left as viewed in Fig. 1, the member 136 is shifted toward the right to bring it into clutched engagement with the teeth 135 on the drum 118 for forward drive and at the same time the upper end of said member 136 through its engagement with the lug 19 acts to move the shifter fork 14 toward the left and thus through its connection with the parts 139 and 69 move these parts with the clutch member 8 toward the left into a position where, by a further movement of these parts, the jaws 7 and 8 may be engaged either manually when the vehicle is at rest or may be engaged automatically under forward drive running conditions when the speed is such that the weights 66 overcome the springs 65' and act through the spring 73 to move the clutch element 8 to a position where it will engage with the co-operative jaw clutch member 7.

The jaws of the members 7 and 8 are of the overrunning type with inclined faces as shown in detail in Fig. 3 so that these parts may overrun and not engage until their speeds are synchronized, the spring 73 permitting relative movement between the jaw member 8 and its actuating weights 66.

Fig. 2 shows somewhat diagrammatically the gearing connections between the shafts 30 and 34 and the driven shaft 12. The shaft 30 has a gear 32 formed thereon or connected thereto, and the shaft 34 has a gear 35 formed thereon or connected thereto. The gear 34 meshes with planet gears 59, and the gear 35 meshes with planet gears 58. The gears 58 and 59 form part of the compound planet gears mounted to revolve on planetary carrier 10 and also including the planet gears 60 which mesh with a gear 48 on the driven shaft 12. The numerals applied to the planet gears and their intermeshing gears are the same as those used in the aforementioned patent. With this gearing arrangement low speed is obtained when the gear 35 is the driver and the planet carrier 10' is held against rotation by the automatic brake including the rollers 119, the drive then being from gear 35 through gears 58 and 60 to the gear 48 on the driven shaft 12. Second speed is obtained when the gear 32 is the driver and the planet gear is stationary, the drive then being from the gear 32 through the gears 59 and 60 to the gear 48 on the driven shaft 12. Under second speed conditions the automatic clutch including the roller 63 permits the shaft 34 to overrun relative to the shaft 30. High speed or direct drive is obtained when the jaw clutch 11 is engaged, as said jaw clutch connects the planetary carrier 10' with the driven shaft 12, and under these conditions the brake including the brake rollers 119 are released automatically through a temporary reduction in speed of the driver part of the gearing relative to the driven shaft 12.

The general method of operation of the device is similar to that of the copending case above referred to and more particularly the modification shown in Fig. 5 except that in the present case the connection of the jaws 7 and 8 directly connects the second speed transmission shaft 34 with the flywheel 4 and hence the engine shaft 2.

The operation in brief is as follows: With the vehicle at rest and the shifter member 94 in a neutral position, the operator starts the engine in the usual manner, but if the battery is run down, the member 94 may be shifted as previously described so as to engage the second speed clutch 7 and 8 and then when the vehicle is pushed the connection of the drive wheels with the gearing 10 will act therethrough to turn the shaft 34 and through said clutch turn the engine shaft 2 to start the engine. Under the first and usual starting conditions after the engine has run for a period sufficient to warm it up, it is throttled down to idling speed and the operator then shifts the member 94 to forward drive where it stays under all ordinary conditions of driving. With the shaft 2 turning above an idling speed the clutch connecting the transmission with the engine is engaged since under these conditions the weights (not shown) bring the clutch elements (not shown) into engagement with the drum 71 (as in the patent heretofore referred to) which then in turning with the actuator 61 picks up the clutch rollers 63 which then grip the drum 65 fast to the low speed transmission shaft 30 and then as noted in said patent the drive will proceed through the low speed gear ratio of the planetary gearing to the driven shaft. Thereafter, at a predetermined car speed the shaft 34, which is then being rotated by the gearing, reaches a speed which causes the weights 66 to move outwardly and through collar 72 and spring 73 move clutch member 8 to an overrunning association with its companion member 7 and then when, as by a temporary reduction in speed of the drive shaft 2 as by temporarily throttling the engine, these clutch parts are brought to a synchronized speed they move into mesh and then on accelerating the motor the torque is picked up and the transmission is in second speed through the second speed gear ratio of the gearing 10.

The change to direct drive involves as in said patent and pending application, the release of the automatic brake rollers 119 by a temporary deceleration of engine speed to release the planetary carrier 10' and then the transmission is connected up for direct drive through the speed responsive clutch such as shown in detail in said patent and application.

Where it is desired under certain driving conditions to deliver the full torque of the engine through the low gear ratio the second speed clutch may be shifted to the neutral position shown in Fig. 1 and the planetary carrier 10' be held stationary by a suitable brake band such as the band 141 of said patent.

Under the second mentioned starting conditions where the clutch members 7 and 8 are initially engaged as soon as the engine starts and takes up its load the transmission will be driven directly in the second speed gear ratio.

I desire it to be understood that this invention is not to be limited to any specific form or arrangement of parts except in so far as such limitations are included in the claims.

What I claim as my invention is:

1. In a change speed transmission mechanism, the combination of a drive shaft, a driven shaft, a planetary gear unit connecting said shafts including a pair of transmission drive shafts, clutch mechanism connecting one of said transmission drive shafts with said first named drive shaft, and speed responsive overrunning jaw clutch mechanism for establishing the drive in either direction through the other of said transmission drive shafts on a temporary reduction in speed of the first named drive shaft and connecting said last named shafts directly together.

2. In a change speed transmission mechanism, the combination of a drive shaft, a driven shaft, a planetary gear unit connecting said shafts including a pair of transmission drive shafts, clutch mechanism connecting one of said transmission drive shafts with said first named drive shaft, speed responsive overrunning jaw clutch mechanism for establishing the drive through the other of said transmission drive shafts on a temporary reduction in speed of the first named drive shaft and connecting said last named shafts directly together, and a manually operable means for also controlling said jaw clutch mechanism and establishing the drive from said second transmission drive shaft to said first named drive shaft.

3. In a change speed transmission mechanism, the combination of a drive shaft, a driven shaft, a planetary gear unit connecting said shafts including a pair of transmission drive shafts, automatic clutch mechanism connecting one of said transmission drive shafts with said first named drive shaft, clutch mechanism for establishing a direct drive through the other of said transmission drive shafts and said first named drive shaft, said last named clutch mechanism being operable at the will of the operator to cut out said automatic clutch mechanism during starting.

OSCAR H. BANKER.